(12) United States Patent
Muppavarapu et al.

(10) Patent No.: US 11,891,774 B2
(45) Date of Patent: Feb. 6, 2024

(54) STRUCTURALLY INTEGRATED FUEL TANK

(71) Applicant: Caterpillar Inc., Peoria, IL (US)

(72) Inventors: Rajkiran Muppavarapu, Savoy, IL (US); Vengadassalam Kalivarathan, Forsyth, IL (US); Nikhil Sharma, Forsyth, IL (US); Matthew Graham Burnette, Decatur, IL (US)

(73) Assignee: Caterpillar Inc., Peoria, IL (US)

( * ) Notice: Subject to any disclaimer, the term of this patent is extended or adjusted under 35 U.S.C. 154(b) by 309 days.

(21) Appl. No.: 17/213,798

(22) Filed: Mar. 26, 2021

(65) Prior Publication Data

US 2022/0307223 A1   Sep. 29, 2022

(51) Int. Cl.
 *B60K 15/03* (2006.01)
 *E02F 9/08* (2006.01)
(52) U.S. Cl.
 CPC ............ *E02F 9/0883* (2013.01); *B60K 15/03* (2013.01); *B60K 2015/03388* (2013.01)
(58) Field of Classification Search
 CPC ....... E02F 9/0883; B60K 15/01; B60K 15/03; B60K 2015/03388; B62D 21/16
 See application file for complete search history.

(56) References Cited

U.S. PATENT DOCUMENTS

| | | | | |
|---|---|---|---|---|
| 2,494,324 A * | 1/1950 | Wright | ................... | E02F 3/844 180/238 |
| 2,535,301 A * | 12/1950 | Le Tourneau | ........ | E02F 3/6454 280/421 |
| 4,087,101 A * | 5/1978 | Shimazaki | ............ | E02F 9/0841 280/834 |
| 4,171,028 A * | 10/1979 | van der Lely | ....... | B62D 53/021 180/69.6 |
| 6,237,952 B1 * | 5/2001 | Burckhartzmeyer | | B60R 21/131 280/756 |
| 6,917,846 B1 * | 7/2005 | Muller | ................. | G07C 5/0841 705/14.1 |
| 7,766,104 B2 * | 8/2010 | Newberry | .............. | B60K 23/04 180/24.09 |

(Continued)

FOREIGN PATENT DOCUMENTS

| | | | | |
|---|---|---|---|---|
| CN | 112912267 A | * | 6/2021 | ............. B60K 15/03 |
| CN | 115122907 A | * | 9/2022 | ............. B60K 15/03 |

(Continued)

*Primary Examiner* — Barry Gooden, Jr.
(74) *Attorney, Agent, or Firm* — von Briesen & Roper, s.c.

(57) ABSTRACT

A structurally integrated fuel tank and method of assembling is disclosed. The fuel tank may comprise a body and a neck disposed on the body. The neck may be configured to be coupled to an arm of a front frame of a machine. The body may comprise a cover, an endwall and a base. The cover includes a cover hitch that defines an upper pivot bore centered about a pivot axis. The upper pivot bore is configured to receive a pivot fastener about which the fuel tank is pivotable. The endwall may be disposed below and coupled to the cover. The base may be coupled to the endwall, and may include a lower hitch that extends outward and away from the endwall. The neck and the body together define a chamber configured to store fuel. The cover is a top of such chamber.

17 Claims, 7 Drawing Sheets

(56) References Cited

U.S. PATENT DOCUMENTS

| | | | |
|---|---|---|---|
| 8,448,750 B2* | 5/2013 | Gaugush | G01F 23/74 |
| | | | 73/309 |
| 8,807,261 B2* | 8/2014 | Subrt | B62D 9/00 |
| | | | 180/235 |
| 8,886,415 B2* | 11/2014 | Shatters | E02F 3/436 |
| | | | 414/815 |
| 8,997,476 B2* | 4/2015 | Brinkman | F15B 21/14 |
| | | | 60/456 |
| 9,387,759 B2* | 7/2016 | Wen | F16K 31/44 |
| 9,725,883 B2* | 8/2017 | Drake | B60W 10/105 |
| 10,214,087 B2* | 2/2019 | Bletscher | B60K 13/04 |
| 10,843,556 B2 | 11/2020 | Mori | |
| 2013/0284752 A1* | 10/2013 | Rund | B60K 15/04 |
| | | | 220/660 |
| 2015/0000258 A1* | 1/2015 | Kondo | B60K 13/04 |
| | | | 60/301 |
| 2015/0136514 A1* | 5/2015 | Arai | E02F 9/0891 |
| | | | 180/309 |
| 2015/0308077 A1* | 10/2015 | Arai | E02F 3/7645 |
| | | | 180/309 |
| 2016/0176278 A1* | 6/2016 | Bletscher | E01C 19/266 |
| | | | 180/291 |
| 2018/0038075 A1 | 2/2018 | Yamada et al. | |
| 2020/0011026 A1* | 1/2020 | Burnette | E02F 3/961 |
| 2020/0040551 A1* | 2/2020 | Yamada | F02M 37/40 |
| 2020/0299927 A1 | 9/2020 | Koyama | |
| 2021/0131068 A1* | 5/2021 | Stahle | E02F 3/431 |
| 2021/0252970 A1* | 8/2021 | Kirita | B60K 15/03 |
| 2022/0025609 A1* | 1/2022 | Springer | E02F 9/0858 |
| 2023/0059902 A1* | 2/2023 | Knapp | B60K 15/07 |

FOREIGN PATENT DOCUMENTS

| | | | | |
|---|---|---|---|---|
| DE | 102022106899 A1 * | 9/2022 | | B60K 15/03 |
| EP | 3686350 A1 | 7/2020 | | |
| WO | 2019038347 A1 | 2/2019 | | |

\* cited by examiner

STRUCTURALLY INTEGRATED FUEL TANK

TECHNICAL FIELD

The present disclosure generally relates to fuel tanks for machines, and more particularly, to fuel tanks for motor graders.

BACKGROUND

Internal space is scarce on machines such as motor graders. Typically, to meet operation requirements, motor graders have utilized a plurality of interconnected small individual fuel tanks mounted on the front frame and, often, an additional auxiliary fuel tank mounted on the rear frame. Hoses interconnect the plurality of fuel tanks located on the front frame to each other and to the engine disposed on the rear frame. Similarly, hoses also connect the auxiliary fuel tank to the engine. As motor graders steer by pivoting about an articulated joint disposed between the front and rear frame, the multiple hoses from the fuel tanks on the front of the machine extend over that articulation joint, typically exposed to the outside environment. As time passes, the hoses and connections between tanks, and between tanks and the engine may develop leaks from wear and tear and exposure to harsh operating environments.

US Publication No. 2020/0299927, published Sep. 24, 2020, (the '927 Publication) describes a fuel tank mounted on an upper turning body of a shovel, and a work walkway provided on an upper surface of a fuel tank and a rollover valve provided at the top of the fuel tank at a position different from the work walkway. When the fuel tank is upright, the fuel tank can communicate with the outside air through the open rollover valve and when the fuel tank overturns, the rollover valve closes. While the '927 Publication may be beneficial, a better fuel tank is desired.

SUMMARY OF THE DISCLOSURE

In one aspect of the present disclosure, a fuel tank is disclosed. The fuel tank comprises a body and a neck disposed on the body. The neck may be configured to be coupled to an arm of a front frame of a machine. The body may comprise a cover, an endwall and a base. The cover includes a cover hitch that defines an upper pivot bore centered about a pivot axis. The upper pivot bore is configured to receive a pivot fastener about which the fuel tank is pivotable. The endwall may be disposed below and coupled to the cover. The base may be coupled to the endwall, and may include a lower hitch that extends outward and away from the endwall. The neck and the body together define a chamber configured to store fuel. The cover is a top of such chamber.

In another aspect of the disclosure, a method of assembling a portion of a front frame of a motor grader is disclosed. The front frame includes a fuel tank and an arm. The method may comprise mounting the fuel tank to the arm. The fuel tank includes a body and a neck disposed on the body. The body and the neck together define a chamber configured to store fuel for the motor grader. The fuel tank includes a hitch disposed on the body. The hitch is configured to receive a pivot fastener that pivotally secures the front frame to a rear frame of the motor grader. The fuel tank and the front frame are pivotable about a pivot axis. The fuel tank is configured to receive external loads through the arm and transfer the external loads to the rear frame.

In yet another aspect of the disclosure, a fuel tank disposed on a motor grader is disclosed. The motor grader including a rear frame, a front frame that includes an arm and the fuel tank coupled to the arm, and a cab mounted on a cover of the fuel tank. The cab may include a roll-over-protection apparatus configured to provide protection to an operator disposed in the cab during a roll-over or overturn condition of the motor grader. The fuel tank may comprise a body and a neck disposed on the body. The neck may be configured to be coupled to the arm of the front frame of the motor grader. The body includes the cover, an endwall, a first sidewall, a second sidewall, and a base. The cover includes a cover hitch that defines an upper pivot bore centered about a pivot axis. The endwall may be disposed below the cover and coupled to the cover. The first sidewall is disposed between the cover and the base. The second sidewall is opposite to the first sidewall. The second sidewall is disposed between the cover and the base. The base may be disposed under the endwall. The base may include a lower hitch that extends outward from the endwall. The lower hitch may define a lower pivot bore centered about the pivot axis of the upper pivot bore. The neck and the body together define a chamber configured to store fuel, wherein the cover is a top of the chamber and the base is the bottom of the chamber. The fuel tank is configured to be pivotable about the pivot axis together with the front frame of the motor grader when a pivot fastener is received in the upper pivot bore and in the lower pivot bore.

DETAILED DESCRIPTION

Figure 1:
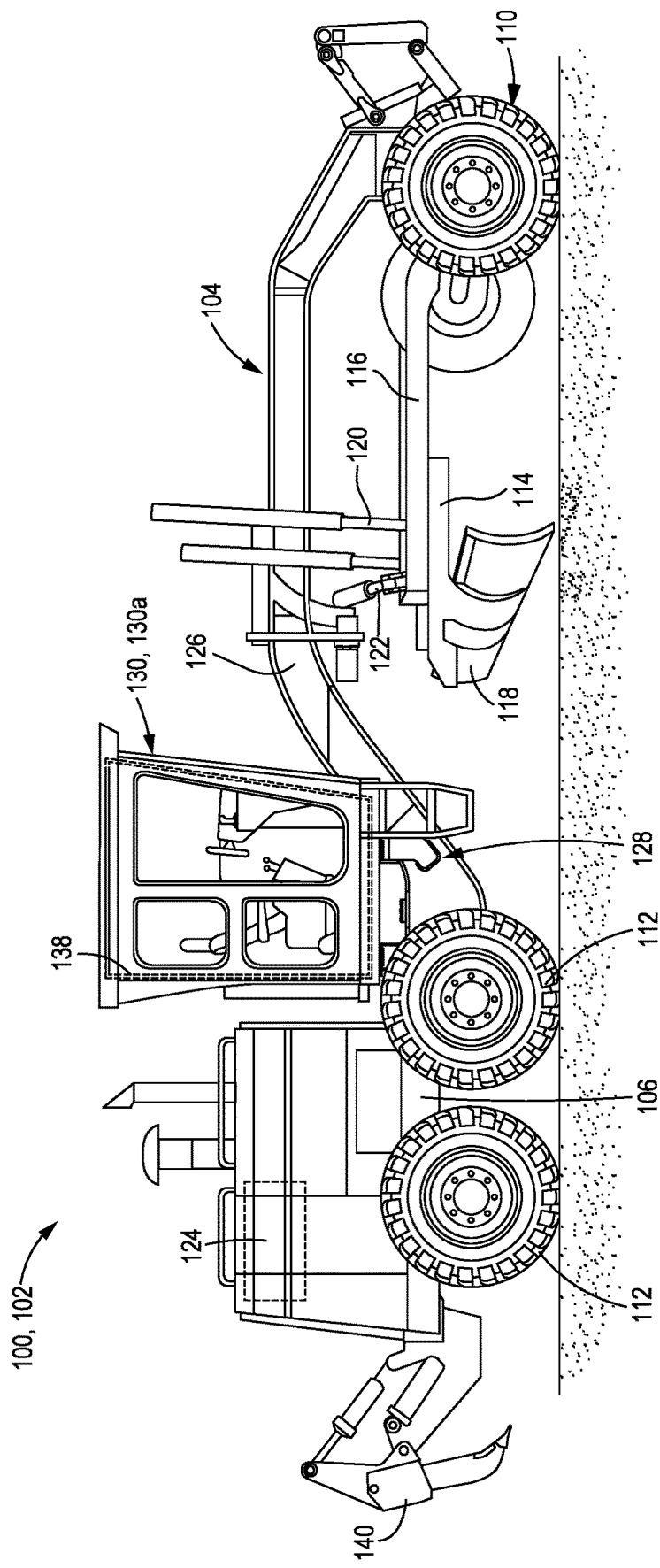
FIG. 1 is a side view of an exemplary machine having a fuel tank, according to the present disclosure.

Reference will now be made in detail to specific embodiments or features, examples of which are illustrated in the accompanying drawings. Generally, corresponding reference numbers will be used throughout the drawings to refer to the same or corresponding parts, unless otherwise specified. FIG. 1 illustrates one example of a machine 100 that incorporates the features of the present disclosure. The exemplary machine 100 may be a vehicle such as motor grader 102.

The motor grader 102 may include a front frame 104 pivotally coupled to a rear frame 106 by a hitch 108 (see FIG. 2), which facilitates steering of the front frame 104 (see FIG. 1) relative to the rear frame 106. The motor grader 102 may further include front wheels 110 and a pair of tandem rear wheels 112. A circle drive gear 114 may be supported by a drawbar 116 connected to the front frame 104. A portion of the circle drive gear 114 may be configured to extend downwardly to pivotally support a moldboard 118. The moldboard 118 may be moved or adjusted to obtain a range of different positions and angles by way of the circle drive gear 114 and a pair of lift actuators 120 and a tilt actuator 122 mounted on the front frame 104.

The rear frame 106 of the motor grader 102 may house an engine 124 and other power train components (not shown) for generating and delivering power to operate the motor grader 102. The engine 124 may be any of a gasoline, diesel, or any other engine 124 employed with such machines 100. The motor grader 102 may even draw power from other power sources, such as natural gas, batteries, fuel cells, etc., as well as combinations thereof. Relatedly, while the transmission (not shown) of the motor grader 102 may typically be a continuous variable transmission (CVT), in at least some embodiments, the transmission may be any of a variety of types that are commonly employed in work or construction machines. For example, in some embodiments, the transmission may be automatic, semi-automatic, manual, direct-drive, or any transmission having a variable output or modulated gear ratio.

Figure 2:
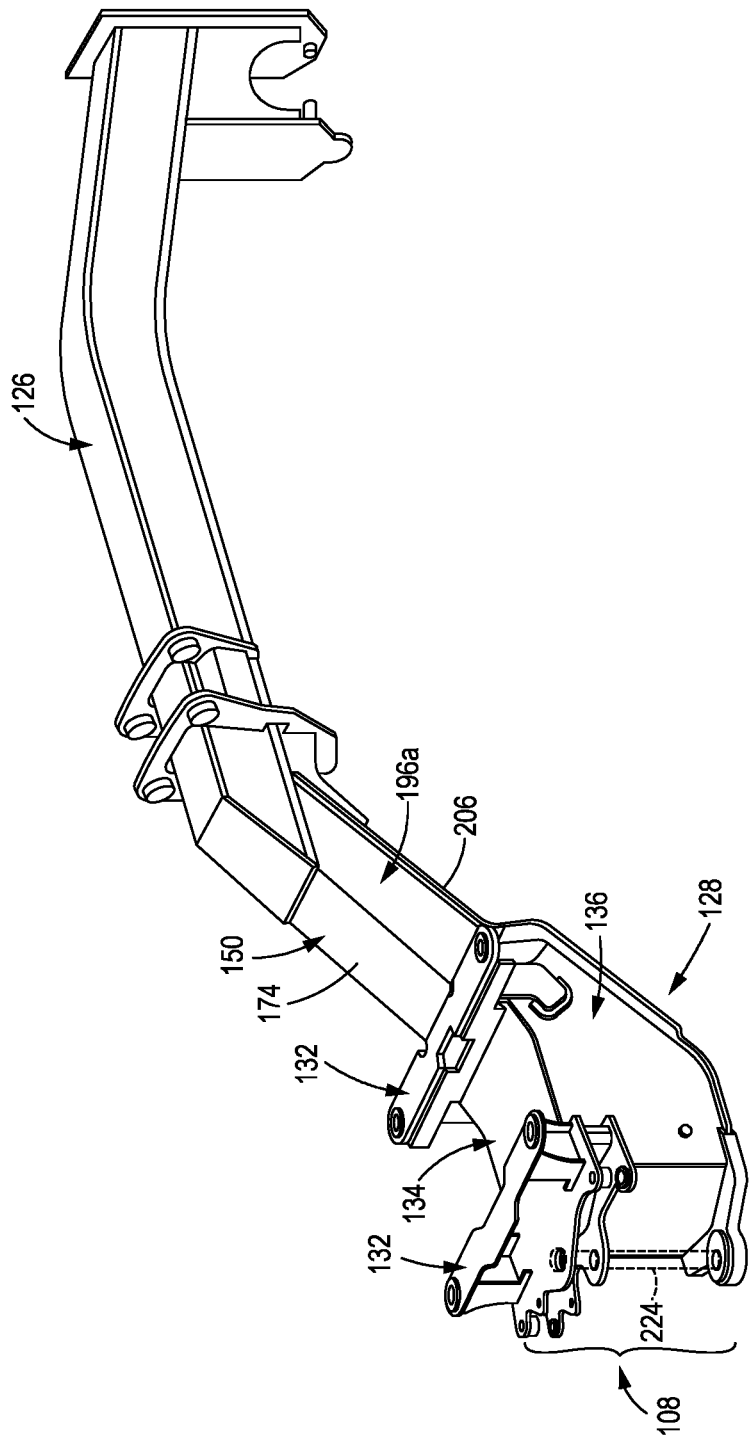
FIG. 2 is a perspective view of an embodiment of the arm and fuel tank of the exemplary machine of FIG. 1.

The front frame 104 further includes an arm 126 and a fuel tank 128 as part of the structure of the front frame 104. As shown in FIG. 2, the arm 126 is coupled to the fuel tank 128. An operator compartment 130 (FIG. 1) is mounted on a rear portion of the front frame 104. More specifically, the operator compartment 130 is mounted on the fuel tank 128. In an embodiment, the operator compartment 130 is mounted to one or more foundations 132 (FIG. 2) coupled to a cover 134 and/or sidewall 136 of the fuel tank 128. The operator compartment 130 (FIG. 1) is configured to house control levers, joysticks, push buttons, and other types of control elements typically known in the art for actuating an operation of the motor grader 102. The operator compartment 130 may include a roll-over-protection (ROP) apparatus 138 configured to provide protection to an operator in the operator compartment 130 from crushing forces or the like during a roll-over or overturn condition of the machine 100 or motor grader 102. In an embodiment, the operator compartment 130 may be a cab 130a. In other embodiments, the operator compartment 130 may not fully enclose the operator (e.g., in a cab 130a such as the one shown in FIG. 1) but may instead be at least partially open to the environment with the ROP apparatus 138 (e.g., a roll-cage or the like) visible. The ROP apparatus 138 may include or be a roll-cage, roll bars, frame or other apparatus known by those of skill in the art to provide space and protection for an operator during a roll-over/overturn of the machine 100. In various countries, the ROP apparatus 138 may be subject to regulations that may include both a strength requirement as well as an energy absorption requirement as during a roll-over/overturn condition large adverse forces may act upon the ROP apparatus 138 and may be transferred to members coupled to the ROP apparatus 138.

The rear frame 106 may also be employed to attach any additional work implements 140, such as a ripper arrangement, blade or the like. While the following detailed description and drawings are made with reference to a motor grader 102, the teachings of this disclosure may be employed on other machines 100.

FIG. 2 illustrates the arm 126 and the fuel tank 128 of the front frame 104. In an embodiment, the fuel tank 128 may be configured to be the only fuel tank 128 from which fuel is provided to the engine 124 (FIG. 1) of the motor grader 102. Such fuel tank 128 is configured to store all of the fuel for use by the engine 124 of the machine 100. In the embodiment shown in the cross-sectional view of FIG. 6, it can be seen that fuel is stored and provided from a fuel tank 128 that has a single chamber 142 that is integral to the fuel tank 128. In other words, the fuel is not stored and provided from a container or the like placed within or mounted to the structure of the front frame 104 that is identified herein as the fuel tank 128. The chamber 142 is sized to eliminate the need for an auxiliary fuel tank and for multiple interconnected primary/secondary fuel tanks, thus eliminating the need for transfer hoses routed between multiple fuel tanks, reducing the number of input ports 144 and output ports 146 (e.g., see FIG. 4) on the fuel tank 128 and reducing the number of hoses (not shown) that channel fuel to the engine 124 (FIG. 1).

Figure 3:
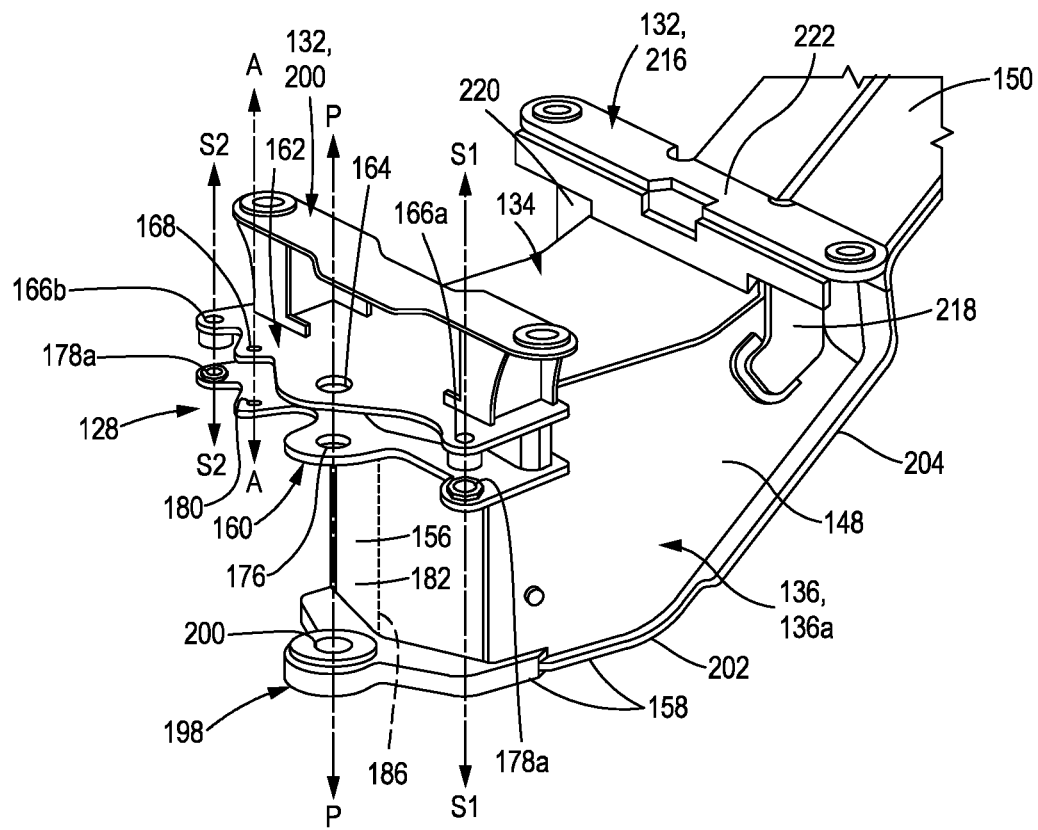
FIG. 3 is an enlarged view of the body of the fuel tank of FIG. 2.
Figure 4:
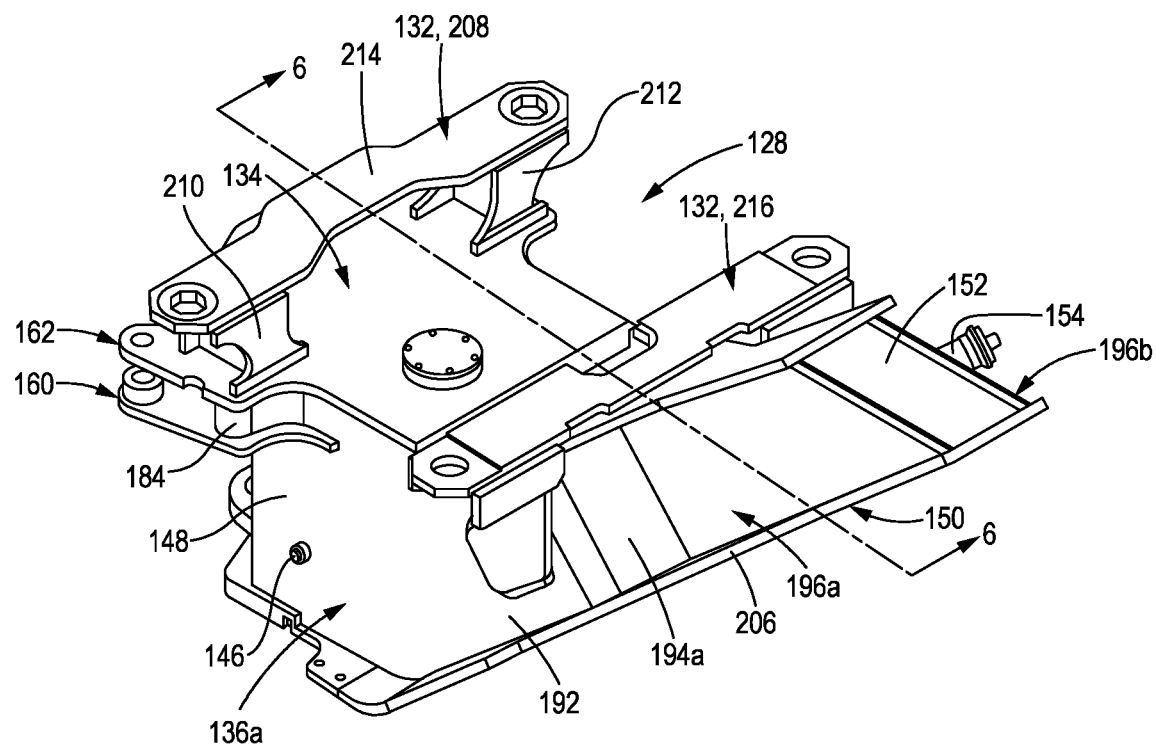
FIG. 4 is another perspective view of an embodiment of the fuel tank of FIG. 2.
Figure 5:
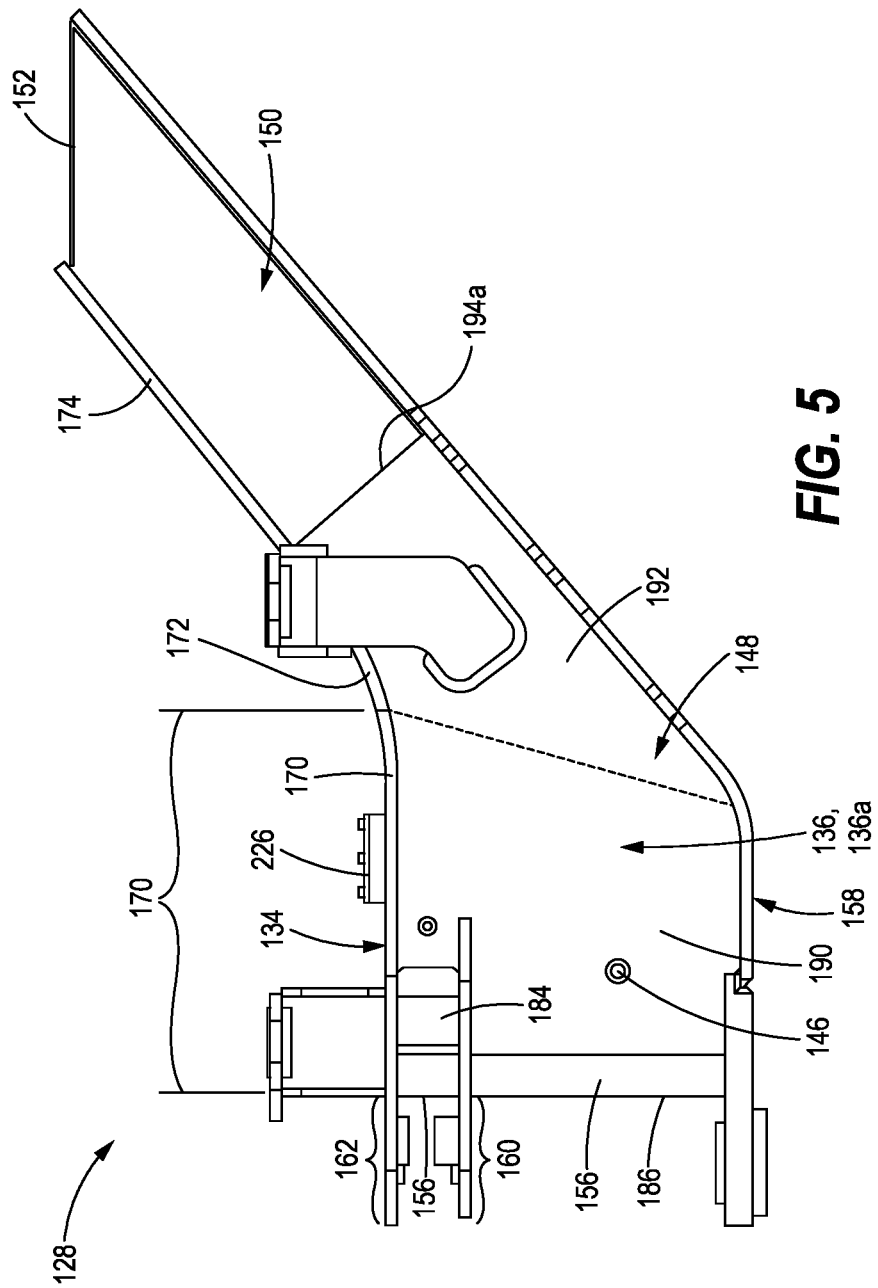
FIG. 5 is a side view of the embodiment of the fuel tank shown in FIG. 4.
Figure 6:
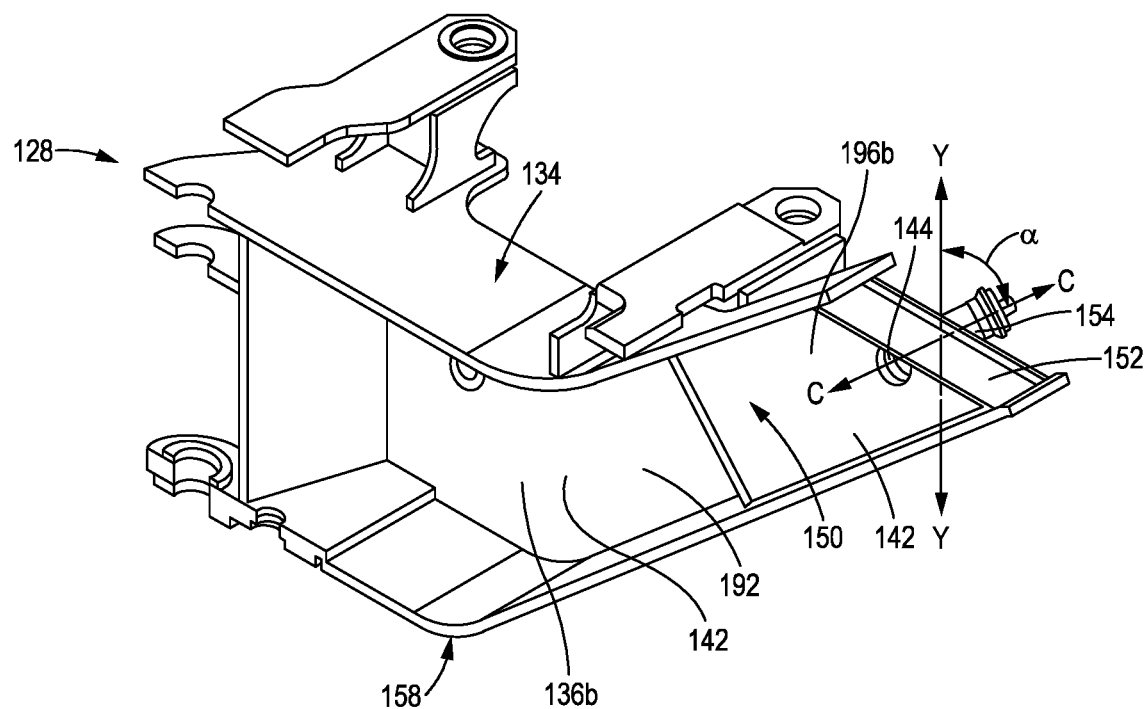
FIG. 6 is a schematic view of a cross section of the fuel tank of FIG. 4 taken along the lines of 6-6.
Figure 7:
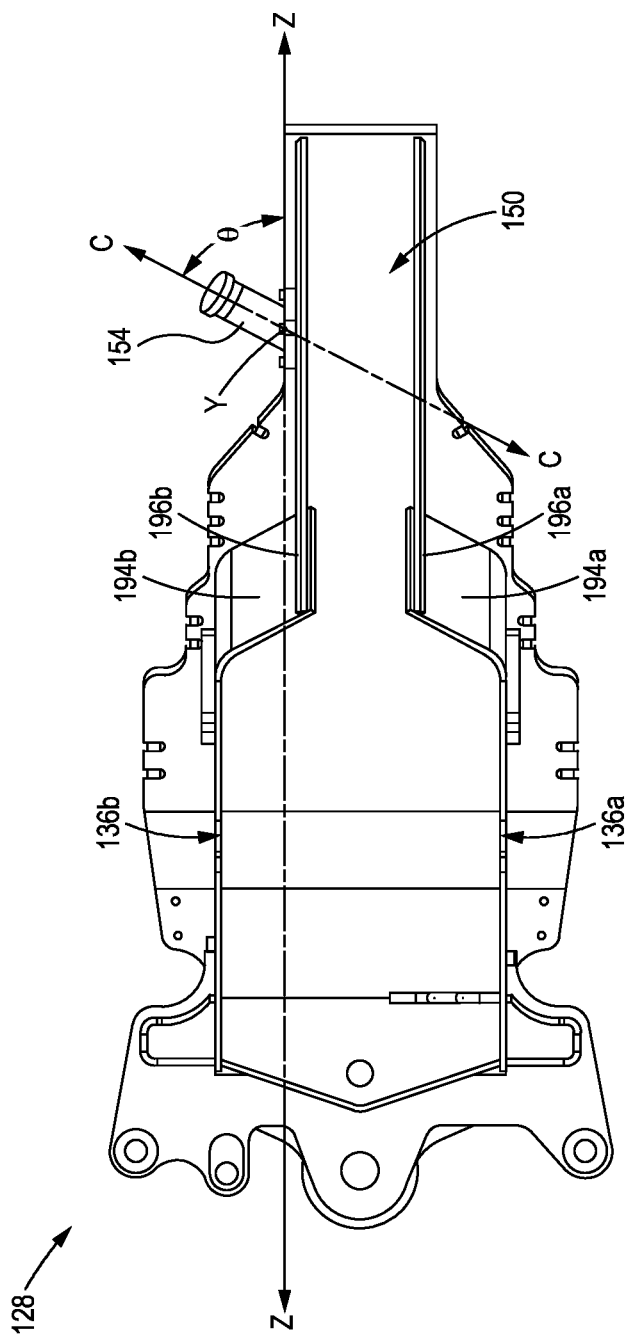
FIG. 7 is a top view of the fuel tank with the foundations removed.

Referring now to FIGS. 3-5, the fuel tank 128 comprises a body 148, a neck 150, a partition 152 (FIGS. 4-5) and a fill pipe 154 (best seen in FIGS. 4, 6 and 7).

The body 148 (FIG. 3) may include the cover 134, an endwall 156, a first sidewall 136a, a second sidewall 136b (see FIG. 6) and a base 158 (FIG. 3). The body 148 may further include an intermediate hitch 160.

The cover 134 includes a cover hitch 162. The cover hitch 162 defines an upper pivot bore 164. The cover hitch 162 may also include a first upper steering bore 166a and a second upper steering bore 166b. The upper pivot bore 164 is disposed between the first upper steering bore 166a and the second upper steering bore 166b. The cover hitch 162 may also define a cover aperture 168, which is configured to receive an articulation lock pin (not shown), disposed between the upper pivot bore 164 and the first upper steering bore 166a or second upper steering bore 166b (as shown in FIG. 3). Such articulation lock pin may be used to lock the pivot connection between the front and rear frames for operations such as maintenance and transporting.

Referring now to FIG. 5, the cover 134 may further include a cover main portion 170 and a cover transition portion 172. The cover transition portion 172 can be partially curved or angled and is oriented at an upward incline (relative to the cover main portion 170) toward the neck 150 such that most of the cover transition portion 172 is disposed above the plane containing the cover main portion 170. The cover main portion 170 extends from the endwall 156 to the cover transition portion 172. In an embodiment the cover main portion 170 and the cover transition portion 172 may be integral. In another embodiment, the cover main portion 170 and the cover transition portion 172 and a top 174 of the neck 150 may be integral (free of joints, e.g., weld joints). In yet another embodiment, the cover hitch 162 and the cover main portion 170 and the cover transition portion 172 and the top 174 of the neck 150 may be integral. In a further refinement of any one of the embodiments above, the cover 134 may be an integral plate. In some embodiments, the cover 134 may also include one or more sensor ports 226 or the like on the cover 134.

The intermediate hitch 160 is disposed below the cover hitch 162. The intermediate hitch 160 defines an intermediate pivot bore 176 (best seen in FIG. 3), and may also include a first intermediate steering bore 178a and a second intermediate steering bore 178b. The intermediate pivot bore 176 is disposed between the first intermediate steering bore 178a and the second intermediate steering bore 178b. The intermediate hitch 160 may also define an intermediate aperture 180, which is configured to receive an articulation lock pin (not shown), disposed between the intermediate pivot bore 176 and the first intermediate steering bore 178a or second intermediate steering bore 178b (as shown in FIG. 3). The intermediate hitch 160 and the intermediate pivot bore 176 project beyond an external face 182 of the endwall 156. The intermediate hitch 160 is mounted to the first sidewall 136a and to the second sidewall 136b.

Each of the upper pivot bore 164 and the intermediate pivot bore 176 are centered about pivot axis P. Each of the first upper steering bore 166a and the first intermediate steering bore 178a are centered about first steering axis S1. Each of the second upper steering bore 166b and the second intermediate steering bore 178b are centered about second steering axis S2. Each of the cover aperture 168 and the intermediate aperture 180 are centered about aperture axis A.

Referring now to FIGS. 4-5, the body 148 may further include one or more buttresses 184 disposed under the cover hitch 162 and on top of the intermediate hitch 160. The buttress 184 couples the cover hitch 162 to the intermediate hitch 160. The buttress 184 may be disposed adjacent to the sidewall 136.

The endwall 156 (FIGS. 3 and 5) is coupled to the cover 134 and to the base 158. As shown in FIGS. 3 and 5, the endwall 156 is disposed below the cover 134 and on top of the base 158. In some embodiments, the endwall 156 may be V-shaped. In one embodiment of endwall 156 that is V-shaped, the vertex 186 of the (V-shaped) endwall 156 may define a line disposed opposite to or aligned in parallel with an axis of the upper pivot bore 164, intermediate pivot bore 176 or lower pivot bore 200. In an embodiment, the endwall 156 may be an integral plate.

As seen in FIG. 5, the sidewall 136 is disposed between the cover 134 and the base 158. More specifically, the first sidewall 136a extends from the cover 134 to the base 158. The second sidewall 136b (FIG. 6) is disposed opposite to the first sidewall 136a and, similar to the first sidewall 136a, the second sidewall 136b is also disposed between the cover 134 and the base 158. More specifically, the first sidewall 136a extends from the cover 134 to the base 158. Each of the first sidewall 136a and the second sidewall 136b include a sidewall main portion 190 and a sidewall transition portion 192. The sidewall transition portion 192 inclines upward toward the neck 150 such that a part of the sidewall transition portion 192 is disposed above the sidewall main portion 190. A broken line on FIG. 5 illustrates a conceptual delineation between the sidewall main portion 190 and the sidewall transition portion 192 (a physical delineation such as a weld is optional). The sidewall main portion 190 extends from the intersection of the sidewall 136 and the endwall 156 to the sidewall transition portion 192. In an embodiment, the fuel tank 128 may include a single output port 146 to which a hose (not shown) is connected to provide fuel to the engine 124. In some embodiments, the output port 146 may be disposed in the first sidewall 136a, second sidewall 136b, endwall 156 or cover 134. In the embodiment shown in FIG. 5, the output port 146 is disposed in the first sidewall 136a.

The first sidewall 136a further includes a first shoulder 194a (best seen in FIG. 4) adjacent to the sidewall transition portion 192 (of the first sidewall 136a) and coupled to the neck 150. In an embodiment, the first shoulder 194a may be integral with the sidewall transition portion 192 of the first sidewall 136a. At the intersection of the first shoulder 194a and the neck 150, the first shoulder 194a is oriented transverse to the neck 150 and transverse to the first sidewall 136a. In some embodiments, the first shoulder 194a may be perpendicular to a first side 196a of the neck 150. The second sidewall 136b (FIGS. 6-7) further includes a second shoulder 194b (best seen in FIG. 7) disposed adjacent to the sidewall transition portion 192 (best seen in FIG. 6) of the second sidewall 136b and coupled to the neck 150. In an embodiment, the second should 194b may be integral with the sidewall transition portion 192 of the second sidewall 136b. The second shoulder 194b is oriented transverse to the neck 150. In some embodiments, the second shoulder 194b may be oriented perpendicular to a second side 196b of the neck 150 and transverse to the second sidewall 136b. In an embodiment of the first sidewall 136a, the sidewall main portion 190 and the sidewall transition portion 192 and the first shoulder 194a may be integral (free of joints, e.g., weld joints) for the first sidewall 136a. In another embodiment, the sidewall main portion 190 and the sidewall transition portion 192 and the second shoulder 194b may be integral (free of joints, e.g., weld joints) for the second sidewall 136b. In an embodiment, the first sidewall 136a and/or the second sidewall 136b may each be an integral plate.

As shown in FIG. 3, the base 158 is disposed under the endwall 156 and includes a lower hitch 198 that extends outward and away from the endwall 156. The lower hitch 198 is disposed below the cover hitch 162. The lower hitch 198 may be disposed below the intermediate hitch 160. The lower hitch 198 defines a lower pivot bore 200 centered about the pivot axis P of the upper pivot bore 164.

The base 158 may further include a base main portion 202 and a base transition portion 204. The base transition portion 204 is oriented at an upward incline (relative to the base main portion 202) toward the neck 150 such that the base transition portion 204 is disposed above the base main portion 202. The base main portion 202 extends from the endwall 156 to the base transition portion 204. In an embodiment the base main portion 202 and the base transition portion 204 may be integral. In another embodiment, the base main portion 202 and the base transition portion 204 and a bottom 206 (best seen in FIG. 4) of the neck 150 may be integral (free of joints, e.g., weld joints), for example an integral plate. In some embodiments, but not all embodiments, the lower hitch 198 and the base main portion 202 and the base transition portion 204 and the bottom 206 of the neck 150 may be integral. In a further refinement, in any of the embodiments above, the base 158 may be an integral plate.

The hitch 108 (FIG. 3) may include the cover hitch 162, intermediate hitch 160 and the lower hitch 198. Each of the upper pivot bore 164 of the cover 134, the intermediate pivot bore 176 of the intermediate hitch 160 and the lower pivot bore 200 of lower hitch 198 are aligned and centered about pivot axis P. Each is configured to receive a pivot fastener 224 (FIG. 2), for example, a pin, a bolt or the like for pivotally securing the front frame 104 (FIG. 1) to the rear frame 106. Each of the first upper steering bore 166a (FIG. 3) and the first intermediate steering bore 178a are centered about first steering axis S1. Each of the first upper steering bore 166a and the first intermediate steering bore 178a is configured to receive a fastener (not shown) for connection to a hydraulic steering cylinder (not shown), or the like. Each of the second upper steering bore 166b and the second intermediate steering bore 178b are centered about second steering axis S2. Each of the second upper steering bore 166b and the second intermediate steering bore 178b is configured to receive a fastener (not shown) for connection to a hydraulic steering cylinder (not shown), or the like as is known in the art.

The fuel tank 128 is configured to be pivotable about the pivot axis P together with the front frame 104 of the motor grader 102 when the pivot fastener (e.g., pin or bolt) is received in the upper pivot bore 164 and in the lower pivot bore 200. Articulation about the pivot axis P may be actuated by hydraulic cylinders or the like as discussed above. For example, the motor grader 102 may include a first steering hydraulic cylinder (not shown) or the like located on a first side of the cover hitch 162 and a second steering hydraulic cylinder (not shown) or the like located on a second side of the cover hitch 162. A rear end of the first and second steering hydraulic cylinders may be coupled to the front of the rear frame 106 proximal to the fuel tank 128. The front end of the first steering hydraulic cylinder may be coupled to the first upper steering bore 166a and the first intermediate steering bore 178a, and the front end of the second steering hydraulic cylinder may be coupled to the second upper steering bore 166b and the second intermediate steering bore 178b. Such first and second steering hydraulic cylinders may be configured to control steering and activate pivoting of the front frame 104 about the pivot axis P. For example, in one embodiment, the first steering cylinder may be retracted and the second steering cylinder may be extended to pivot the front frame 104 in a clockwise direction, and the first steering cylinder may be extended and the second steering cylinder retracted to pivot the front frame 104 in a counter-clockwise direction, as is known in the art. The resulting articulation about the pivot axis P facilitates steering of the motor grader 102.

The fuel tank 128 may also comprise one or more foundations 132 (FIGS. 3-5) to which the ROP apparatus 138 (FIG. 1) is mounted, for example a rear foundation 208 and a forward foundation 216. Each of the rear foundation 208 and the forward foundation 216 is configured to support the ROP apparatus 138 for the operator compartment 130 during a roll-over or overturn condition of the motor grader 102. In an embodiment, the rear foundation 208 (FIG. 4) may include a first foot 210 and a second foot 212, and a rear bracket 214 disposed on top of and extending between the first foot 210 and the second foot 212. The rear foundation 208 may be mounted to the cover 134 between the upper pivot bore 164 (FIG. 3) and the neck 150. The forward foundation 216 may be disposed between the rear foundation 208 and the neck 150. The forward foundation 216 may include a first leg 218, a second leg 220 and a forward bracket 222 disposed on top of and extending between the first leg 218 and the second leg 220. The forward foundation 216 may be mounted to the first sidewall 136a via the first leg 218 and mounted to the second sidewall 136b via the second leg 220. The first leg 218 and the second leg 220 each are configured to position the forward foundation 216 above and across the cover 134 and above the first shoulder 194a and the second shoulder 194b. In the embodiment shown in FIG. 3, the top of the rear foundation 208 is substantially level with the top of the forward foundation 216.

The neck 150 is disposed on the body 148 and is configured to be coupled to the arm 126 (FIG. 1) of the front frame 104 of the motor grader 102. The neck 150 (FIG. 2) may comprise a top 174, a bottom 206, a first side 196a and a second side 196b. The cover 134 and the top 174 of the neck 150 may be integral. The base 158 and the bottom 206 of the neck 150 may be integral (e.g., without or free of weld joints or the like)

The partition 152 (FIG. 4) is disposed across an end of the neck 150 that is distal from the shoulder 194 and adjacent to the arm 126. More specifically, the partition 152 may extend from a first side 196a to a second side 196b of the neck 150 and is configured to prevent the arm 126 (FIG. 1) from being exposed to fuel contained in the chamber 142 (FIG. 6).

The neck 150 and body 148 together define a (fuel) chamber 142 that is configured to store fuel for the engine 124 of the motor grader 102. The cover 134 is a top of the chamber 142 and the base 158 is the bottom of the chamber 142. The first sidewall 136a, the second sidewall 136b, the endwall 156 and the partition 152 are each walls of the chamber 142. While it may be typical for fuel tanks 128 to contain internal baffles to restrict fuel slosh and foaming during filling and during movement of the motor grader 102, the chamber 142 of the fuel tank 128 disclosed herein may, in an embodiment, free of internal baffles, as shown in FIG. 6. As used herein, "free of internal baffles" means that the chamber 142 does not contain any internal baffles. Internal baffles are typically used to restrict fuel slosh and foaming during filling. As configured, the fuel tank 128 disclosed herein restricts fuel slosh and foaming without the need for internal baffles, which contributes to fast filling of the fuel tank 128.

The fill pipe 154 (FIG. 6) is configured to receive fuel and convey the fuel into the chamber 142 through an input port 144 disposed in the fuel tank 128. In an embodiment, the fill pipe 154 may be disposed over an input port 144 disposed on the body 148 or the neck 150. In the embodiment of FIG. 6, the fill pipe 154 is disposed on the second side 196b of the neck 150 over the input port 144 disposed on the second side 196b of the neck 150. In an embodiment, the fill pipe 154 is inclined or tilted upward toward the arm 126 and away from (the side 196 of) the neck 150. The fill pipe 154 is disposed under the operator compartment 130 and on the body 148 or neck 150 of the fuel tank 128 and is configured to provide ground-level fueling of the motor grader 102. As used herein, ground-level fueling means that fuel may be pumped into the fuel tank 128 by an operator or attendant disposed on the ground, as opposed to the operator or attendant having to climb onto the motor grader 102 to refuel the machine 100. In an embodiment, the fill pipe 154 is disposed on the neck 150 (e.g., a first side 196a or a second side 196b of the neck 150). The fill pipe 154 has a centerline C extending along the length of the fill pipe 154. The fill pipe 154 is configured such that the fill pipe size 154, an angle of incline a and an angle of tilt θ reduces back-splash foaming during fueling. In an embodiment, the angle of incline a of the fill pipe 154 as measured from the centerline C to the vertical axis Y (that intersects the centerline C) may be in the range of 50° to 60°, 52° to 58° or 54° to 56° as shown in FIG. 6. In an embodiment the angle of tilt θ front the centerline C to a plane Z may be in the range of 21° to 31°, or 23° to 29° or 25° to 27°. The plane Z may be defined by the vertical axis Y and an axis Z. The axis Z is perpendicular to the vertical axis Y and is parallel to the direction of travel of the front frame 104 of the machine 100 when the machine 100 is operational. In an embodiment, by way of nonlimiting example, the configuration of the fuel tank 128 and the fill pipe 154 may provide up to about thirty (30) gallons per minute fill rate of the fuel tank 128. For example, the chamber 142 of the fuel tank 128 may be filled with about 100 gallons of fuel in less than 3.5 minutes.

On earthmoving machinery, load from the ground engaging tools (e.g., the moldboard 118, work implement 140 (ripper arrangement, blade or the like)) working the ground is transferred from such ground engaging tools to the front frame 104 and to the rear frame 106. Typically, fuel tanks 128 are separate components mounted on a machine 100 and do not structurally distribute or transfer the external loads received by the front frame 104 from the ground engaging tools to the rear frame 106 and vice versa. The fuel tank 128 disclosed herein is a part of the front frame 104 and, as such, is a primary external load carrying member of the front frame 104. The fuel tank 128 disclosed herein is configured to receive external loads from other portions of the front frame 104 and transfer such loads to the rear frame 106 and vice versa through the (articulation) hitch 108 connection. Furthermore, typically, a conventional fuel tank does not provide support to the ROP apparatus 138. The fuel tank 128 disclosed herein, resists the significant destructive forces encountered during a roll-over/overturn event to support the ROP apparatus 138 resistance to such forces while maintaining (fuel) chamber 142 integrity to prevent an escape of fuel from the fuel tank 128 during a roll-over/overturn condition. In other words, the fuel tank 128 is configured to resist destructive forces (transferred to the fuel tank 128 by the front frame 104 and ROP apparatus 138) to the integrity of the fuel tank 128 during a roll-over/overturn condition.

Also disclosed is a method for assembling a portion of a front frame 104 of a motor grader 102, the front frame 104 including a fuel tank 128 and an arm 126, the method comprising: mounting the fuel tank 128 to the arm 126, the fuel tank 128 including body 148 and a neck 150, the neck 150 disposed at a first end of the fuel tank 128, the fuel tank 128 and the neck 150 together defining a chamber 142 configured to store fuel for the motor grader 102, the fuel tank 128 including a hitch 108 disposed on the body 148, the hitch 108 configured to receive a pivot fastener 224 that pivotally secures the front frame 104 to a rear frame 106 of the motor grader 102, the fuel tank 128 and front frame 104 pivotable about a pivot axis P, the fuel tank 128 configured to receive external loads from the arm 126 and transfer the external loads to the rear frame 106 and configured to receive external loads from the rear frame 106 and transfer the external loads to other portions of the front frame 104. The method may further comprise mounting the ROP apparatus 138 to the foundation(s) 132 of the fuel tank 128, the foundation(s) 132 configured to support the ROP apparatus 138 during a roll-over or overturn condition.

INDUSTRIAL APPLICABILITY

In general, the foregoing disclosure finds utility in machines 100, especially motor graders 102, that have limited internal space for the mounting of fuel tanks 128 because the fuel tank 128 disclosed herein is both a structural load bearing member of the front frame 104 and a repository of fuel for the engine 124.

More specifically, the disclosed front frame 104 that includes the fuel tank 128 may store all of the fuel for the engine 124 in the chamber 142 that is integral to the fuel tank 128. This eliminates the need for auxiliary fuel tanks, multiple interconnected primary/secondary fuel tanks and associated transfer hoses between multiple fuel tanks, and reduces the number of input ports 144 and output ports 146 on the fuel tank 128, and reduces the number of hoses that channel fuel to the engine 124.

Moreover, the fuel tank 128 disclosed herein structurally distributes/transfers the external loads received by the front frame 104 from the ground engaging tools to the rear frame 106 and vice versa. The fuel tank 128 is a primary external load carrying member of the front frame 104 and is configured to receive external loads from other portions of the front frame 104 and transfer such loads to the rear frame 106 and vice versa through the (articulation) hitch 108 connection.

Furthermore, the fuel tank 128 resists the significant destructive forces encountered during a roll-over/overturn event to support the ROP apparatus 138 resistance to such forces while maintaining (fuel) chamber 142 integrity to prevent an escape of fuel from the fuel tank 128 during a roll-over/overturn condition.

From the foregoing, it will be appreciated that while only certain embodiments have been set forth for the purposes of illustration, alternatives and modifications will be apparent from the above description to those skilled in the art. These and other alternatives are considered equivalents and within the spirit and scope of this disclosure and the appended claims.

What is claimed is:

1. A fuel tank comprising:
   a body including:
      a cover that includes a cover hitch, the cover hitch defining an upper pivot bore centered about a pivot axis, the upper pivot bore configured to receive a pivot fastener, about which the fuel tank is pivotable;
      an endwall disposed below and coupled to the cover; and
      a base coupled to the endwall, the base including a lower hitch that extends outward and away from the endwall;
   a neck disposed on the body, the neck configured to be coupled to an arm of a front frame of a machine,
   a rear foundation mounted to the cover between the upper pivot bore and the neck; and
   a forward foundation mounted to the cover,
   wherein the rear foundation and the forward foundation are configured to support a roll-over-protection (ROP) apparatus of an operator compartment of the machine,
   wherein the neck and the body together define a chamber configured to store fuel, wherein further the cover is a top of the chamber.

2. The fuel tank of claim 1, wherein the chamber does not contain internal baffles.

3. The fuel tank of claim 1, wherein the lower hitch defines a lower pivot bore centered on the pivot axis.

4. The fuel tank of claim 1, in which the cover further includes a cover main portion and a cover transition portion, the cover main portion disposed between the cover hitch and the cover transition portion, the cover transition portion oriented at an upward incline from the cover main portion toward the neck.

5. The fuel tank of claim 1, in which the body further includes a first shoulder disposed adjacent to the neck, the first shoulder oriented transverse to the neck.

6. The fuel tank of claim 5, in which the fuel tank further includes a partition disposed across the neck.

7. The fuel tank of claim 1, in which the endwall is V-shaped.

8. A method of assembling a portion of a front frame of a motor grader, the front frame including a fuel tank and an arm, the method comprising:
   mounting the fuel tank to the arm, the fuel tank including a body and a neck disposed on the body, the body and the neck together defining a chamber configured to store fuel for the motor grader, the body including a cover, the cover including a hitch that defines an upper pivot bore centered about a pivot axis, the hitch configured to receive in the upper pivot bore a pivot fastener that pivotally secures the front frame to a rear frame of the motor grader, the fuel tank and the front frame pivotable about the pivot axis, and the fuel tank configured to receive external loads through the arm and transfer the external loads to the rear frame;
   mounting a rear foundation to the cover between the upper pivot bore and the neck; and
   mounting a forward foundation to the cover,
   wherein the rear foundation and the forward foundation are configured to support a roll-over-protection (ROP) apparatus of an operator compartment of the motor grader.

9. The method according to claim 8, wherein the body further includes a base and a first sidewall disposed between the cover and the base, the first sidewall including an integral first shoulder.

10. A fuel tank disposed on a motor grader, the motor grader including a rear frame, a front frame that includes an arm and the fuel tank coupled to the arm, and a cab mounted on a cover of the fuel tank, the cab including a roll-over-protection apparatus configured to provide protection to an operator disposed in the cab during a roll-over or overturn condition of the motor grader, the fuel tank comprising:
a body including:
the cover that includes a cover hitch, the cover hitch defining an upper pivot bore centered about a pivot axis;
an endwall disposed below the cover and coupled to the cover;
a first sidewall disposed between the cover and a base;
a second sidewall opposite to the first sidewall, the second sidewall disposed between the cover and the base; and
the base having a portion disposed under the endwall, the base including a lower hitch that extends outward from the endwall, the lower hitch defining a lower pivot bore centered about the pivot axis of the upper pivot bore; and
a neck disposed on the body, the neck configured to be coupled to the arm of the front frame of the motor grader,
a rear foundation mounted to the cover between the upper pivot bore and the neck; and
a forward foundation mounted to the cover,
wherein the rear foundation and the forward foundation are configured to support the roll-over-protection apparatus,
wherein the neck and the body together define a chamber configured to store fuel, wherein further the cover is a top of the chamber and the base is the bottom of the chamber, and
wherein the fuel tank is configured to be pivotable about the pivot axis together with the front frame of the motor grader when a pivot fastener is received in the upper pivot bore and in the lower pivot bore.

11. The fuel tank of claim 10 further comprising an intermediate hitch disposed below the cover hitch, the intermediate hitch defining an intermediate pivot bore centered about the pivot axis.

12. The fuel tank of claim 11, wherein the intermediate hitch projects beyond an external face of the endwall.

13. The fuel tank of claim 10, wherein the chamber is free of internal baffles.

14. The fuel tank of claim 10, in which the cover further includes a cover main portion and a cover transition portion, the cover main portion is disposed between the cover hitch and the cover transition portion, the cover transition portion is disposed adjacent to the neck and is oriented at an upward incline from the cover main portion.

15. The fuel tank of claim 10, wherein the cover hitch defines a first upper steering bore and a second upper steering bore, wherein the upper pivot bore is disposed between the first upper steering bore and the second upper steering bore.

16. The fuel tank of claim 10, in which the first sidewall includes a first shoulder disposed adjacent and transverse to the neck, and the second sidewall includes a second shoulder disposed adjacent and transverse to the neck.

17. The fuel tank of claim 10, in which the fuel tank further includes a partition disposed across the neck and adjacent to the arm.

* * * * *